United States Patent
Brunsting

(10) Patent No.: US 6,554,999 B2
(45) Date of Patent: Apr. 29, 2003

(54) MAGNETIC ASSEMBLY TO APPLIED AGAINST AN OIL FILTER

(76) Inventor: William J. Brunsting, 3181 Douglas Dr., Lake Havasu City, AZ (US) 86404

( * ) Notice: Subject to any disclaimer, the term of this patent is extended or adjusted under 35 U.S.C. 154(b) by 80 days.

(21) Appl. No.: 09/817,467

(22) Filed: Mar. 26, 2001

(65) Prior Publication Data

US 2002/0134719 A1 Sep. 26, 2002

(51) Int. Cl.$^7$ ............................................... B01D 35/06
(52) U.S. Cl. ....................... 210/222; 210/223; 184/6.25
(58) Field of Search ................................. 210/222, 223, 210/695, 224; 335/302, 303, 304, 306; 209/636, 609, 213, 212; 96/1; 95/28; 184/6.25

(56) References Cited

U.S. PATENT DOCUMENTS

| | | | | |
|---|---|---|---|---|
| 3,892,658 | A | * | 7/1975 | Benowitz |
| 4,217,213 | A | * | 8/1980 | Schuster |
| 5,354,462 | A | * | 10/1994 | Perrit |
| 5,510,024 | A | * | 4/1996 | Caiozza |
| 5,556,540 | A | | 9/1996 | Brunsting |
| 5,714,063 | A | | 2/1998 | Brunsting |
| 5,932,108 | A | | 8/1999 | Brunsting |

OTHER PUBLICATIONS

FilterMag™; "Patented Filtermag removes steel particles as small as 2 micron from engine oil" Auguat 2002 [retrieved on Oct. 2002]; Retrive4d from the internet <URL: www-.filtermag.com22 .*

* cited by examiner

Primary Examiner—W. L. Walker
Assistant Examiner—K S Menon
(74) Attorney, Agent, or Firm—Jack C. Munro

(57) ABSTRACT

A magnetic device for attachment to an exterior wall of an oil filter canister whose purpose is to attract ferrous particles being conducted through the oil passing through the oil filter canister and cause such to be adhered to the inner wall surface of the sidewall of the oil filter canister. The device has an enclosing frame within which is mounted a series of thin walled plates. The plates are located in a stacked relationship. The plates permit flexing of the enclosing frame so that a plurality of magnets that are mounted in conjunction with the frame will always be located flush against the exterior wall surface of the canister even though the diameter of the canister may vary by the canisters being constructed by different manufacturers. The magnets are coated with a plastic coating to prevent contact with moisture to prevent rusting of the magnets. Abutting surfaces of the magnets are prevented from direct contact by the use of a thin plastic strip to thereby prevent degradation of the coating and exposing of the surface of the magnets to the ambient conditions which could also cause rust. A lanyard may be provided as a safety harness to connect the device to an exterior structure.

14 Claims, 2 Drawing Sheets

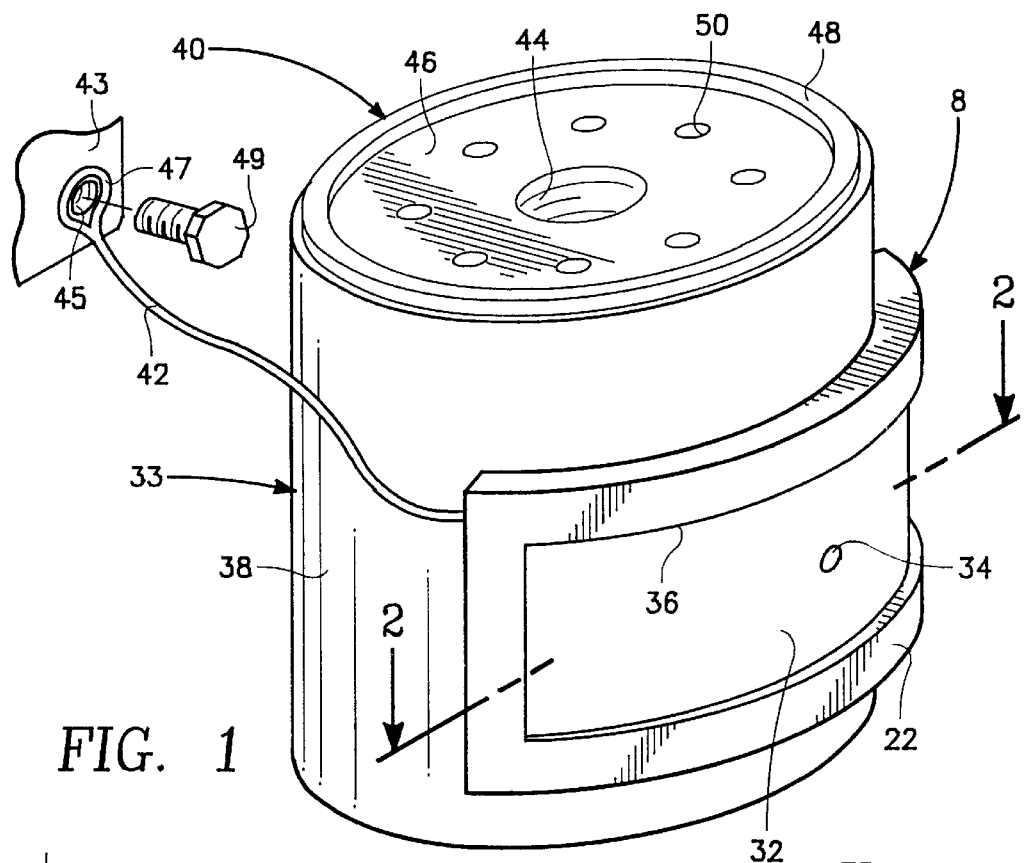
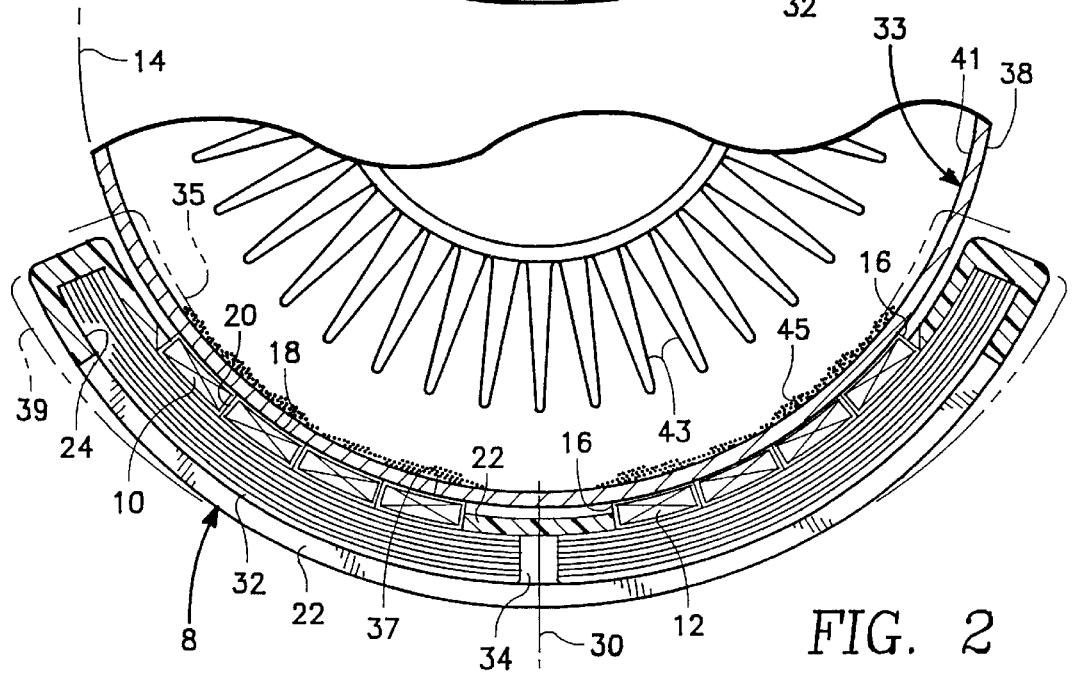

MAGNETIC ASSEMBLY TO APPLIED AGAINST AN OIL FILTER

BACKGROUND OF THE INVENTION

1. Field of the Invention

The present invention generally relates to an adjustable assembly for removing submicron to micron sized ferrous particles from moving liquids and in particular, is concerned with a series of magnets locatable on an oil filter canister usable within a closed system of lubricating oil with the series of magnets to be mounted on the exterior surface of the oil filter which results in a magnetic force attracting and holding ferrous particles entrained within the oil against the inside surface of the oil filter preventing circulation of these particles within the closed system and thereby within the engine to which the closed system connects.

2. Description of the Prior Art

Most engines used in automobiles, trucks and boats include canister-shaped oil filters that filter the engine's lubricating oil, removing foreign matter therefrom. To eliminate the larger particles of foreign matter, the engine oil is typically forced through a porous material in the oil filter that allows the liquid oil to pass through, but does not allow the passage of the larger particles. In this manner, the larger particles of foreign matter can be removed from the engine's lubricating oil. However, because this separation technique relies upon filtration through a porous material, particles that are smaller than the openings in the porous material are normally not removed by the filter medium. One particularly harmful type of foreign matter in lubricating oil is the small metallic (ferrous) particles which are created by the frictional contact between the moving metal parts of the engine. These particles are actually shards of metal from the metal parts of the engine that are dislodged during operation of the engine. These metallic particle contaminants can damage important engine components as such circulate through the engine.

Small metallic particles often have a cross-sectional dimension smaller than the openings in the porous filter material which means the oil filter is ineffective in the removing of these particles. When not removed by the oil filter, these small metallic particles will freely circulate through the engine until they are finally removed when the oil is changed. Typically, the porous material used in oil filters consists of a fibrous material that has openings with an average diameter greater than 20 microns. Hence, metallic particles with a cross-sectional dimension of 20 microns or smaller are often not trapped by the filter. Some metallic particles are larger than 20 microns. These metallic particles have sharp edges. Movement of these large particles by the force of the flow of the oil will cause these particles to "slice" like a knife through the filter producing holes greater than 20 microns thereby decreasing the filtering effectiveness of the oil filter.

The micron and submicron sized metallic particles are a major cause of wear of the moving components of the engine. Specifically, as the oil is circulated throughout the engine to lubricate the various moving components, the metallic particles entrained in the oil are carried to the interface between the moving components. At these locations, the hardness of the metallic particles causes metal to bear against metal, and reliance is placed solely upon the oil to maintain a lubricating film. When these metallic particles are brought to these interfaces, damage to the adjoining surfaces is likely. This damage eventually results in a degradation of the close tolerances between the moving parts, causing a loss in operating engine efficiency and more frequent maintenance in the form of repair. By some estimates, these metallic particles are the cause of more than one-half of the wear on the engine.

One approach taken by the prior art to eliminate these particles has been to install a magnetized drain plug in the crankcase of the engine. The magnetized drain plug generates a magnetic field around the magnet within the crankcase, which in turn attracts and removes some of the metallic particles from the lubricating oil as it flows through the crankcase. However, when the engine is running, the flow of oil through the crankcase can be at such a high flow rate so as to carry the metallic particles entirely through the magnetic field produced by the magnetized drain plug. In other cases, the magnetic field itself is insufficiently strong or extensive to attract and remove a meaningful number of particles from the lubricating oil.

Another prior approach to solve this problem has been to attach a magnet to the oil filter canister intending to create a magnetic field within the filter to attract and hold the ferrous particles against the walls of the filter. Unfortunately, these prior art attempts did not generate a sufficiently strong magnetic field to attract and hold any significant number of the metallic particles in the oil. The metallic particles contained in the oil, even if such pass through the magnetic field, are not likely to be attracted and thus continue to circulate through the engine.

A magnetic belt assembly for oil filters is disclosed in U.S. Pat. No. 3,460,679. This patent teaches securing the outside surface of permanent magnets to the inner surface of an annular spring steel belt. The belt is placed around an oil filter cartridge with the inner surfaces of the magnets engaging the outer surface of the cartridge. The cartridge is magnetized by the magnets to attract metallic particles from the oil therein. The magnets are elongated and aligned axially on the cartridge. The magnets are spaced relative to each other on the spring steel belt which is more narrow than the elongated axial dimension of the magnets. As a result, only the middle region of the back surface of the magnets is covered by the narrow belt.

One significant problem associated with the device disclosed in U.S. Pat. No. 3,460,679 is the inability to generate a sufficiently strong magnetic field within the filter cartridge. The intensity of the magnetic field generated by the magnets is greater on the outside of the cartridge than on the inside thereof due to the influence of the metallic cylindrical outer wall of the cartridge. The present inventor actually constructed a device according to U.S. Pat. No. 3,460,679 and used a gauss meter to take measurements of the amount of magnetic force that was produced. The magnets that were used were bonded to iron having approximately a 5 MG maximum energy product. The band utilized was constructed of spring steel of a thickness of 0.032 of an inch with a width of 0.375 of an inch. There were ten in number of magnets used that were located circumferentially around the filter canister about two inches from the top surface of the canister. The annular spring steel belt was centered over the middle of the magnets thus about 37.5% of the back of the magnets was covered by the annular spring steel belt. The magnets were separated from each other by 1.25 inch from edge to edge in a circumferential direction. The gauss readings on the back of the annular spring steel belt were 836 gauss, on the back of the exposed magnets was 1526 gauss with the reading inside the canister being only 98 gauss. It can thus be seen that compared to the magnet force of the magnets themselves, only about 7% of the magnetic force is supplied to within the canister. Therefore, most of the metallic particles suspended in the oil flowing within the cartridge are not retained within the cartridge by the relatively weak magnetic field therein.

Reference is to be had to U.S. Pat. No. 3,402,820, Lohmann, in which there was disclosed a magnetic cleaner for a coolant. The coolant is to be moved through an elongated conduit and on the exterior wall of the conduit is mounted a magnetic arrangement. The magnetic arrangement comprises a plurality of different magnets which are separated by spacers. The magnets and the spacers are retained in place on the conduit by means of a clamping arrangement on the exterior surface of the magnetic arrangement. This structure of Lohmann was never designed to be utilized within a pressurized environment which is where the structure of the present invention is intended to be used. In most instances the mounting of an oil filter within an engine is in a very restricted area with very little space being left between the oil filter and the engine block or other associated parts of the engine. In other words, space is minimal. The structure of Lohmann is of such a great size that it would be incapable of being used in conjunction with an oil filter mounted on an engine. Additionally the spacing of the magnets within Lohmann substantially decreases the magnetic field within the elongated conduit. The present inventor constructed the device of Lohmann and again made gauss readings on the device. Magnets used were the same as those used in the discussion in the reference of U.S. Pat. No. 3,460,679. Because of the spacing of the magnets within Lohmann, the magnetic field recorded only 0.63 kG within the canister. If the magnets were placed in a flush abutting relationship as is the case within the present invention, the reading would increase within the canister to 1.69 kG.

The present inventor has obtained U.S. Pat. Nos. 5,556,540, 5,714,063 and 5,932,108 on improved devices to be mounted on the exterior surface of an oil filter for removing of metallic particles within the oil passing through the filter. Although these devices are known to work at a much improved level of operation, these devices have deficiencies. One deficiency has to do with the flux band that supports the magnets. The flux band previously has been constructed to be rigid. Oil filters of the same size and of different manufacturers vary slightly in diameter. It is important that the magnets be pressed tightly into contact with the exterior surface of the oil filter. If the flux band is designed for a slightly different diameter than the oil filter on which it is being used, the result is that some of the magnets will not be pressed tightly against the oil filter causing diminished performance.

SUMMARY OF THE INVENTION

The primary objective of the present invention is to construct a device that includes an assembly of magnets that is to be mounted on the exterior surface of an oil filter canister where the device can be adjustable to accommodate to differences in diameters of oil filters so that all of the magnets of the magnet assembly will be pressed against the exterior surface of the oil filter to the inside surface of the canister in order for the device to operate optimally to not only hold tightly to the canister but also extract and hold most ferrous particles from the oil passing through the canister.

The structure of the present invention comprises a device that utilizes a plurality of bar magnets which are located in a side-by-side arrangement. An enclosing frame constructed of non-magnetizable material is mounted about the magnets and is constructed to tightly hold the magnets together. The flux band is constructed of a plurality of thin low carbon steel plates with these plates being interlocked together at the longitudinal center point. The thin sheets of steel are located in the configuration of an arc with this arc being a segment of a circle. The material of construction of the enclosing frame will preferably comprise nylon with this nylon and the thin sheets of low carbon steel (with high permeability) of the flux band permitting adjustability of the device so as to expand to a slightly greater diameter or capable of being moved to a slightly diameter. The result is, although the device is manufactured for a specific diameter of oil filter, the device can adjust to a slightly increased diameter and also to a slightly smaller diameter, and in each instance, the surface of the magnets will be maintained flush against the exterior surface of the oil filter.

BRIEF DESCRIPTION OF THE DRAWINGS

FIG. 1 is an isometric view of the magnet device of the present invention showing as it being applied to the exterior surface of an oil filter;

FIG. 2 is a longitudinal cross-sectional view through the magnet device and filter canister taken along line 2—2 of FIG. 1;

DETAIL DESCRIPTION OF THE PREFERRED EMBODIMENTS

Figure 3:
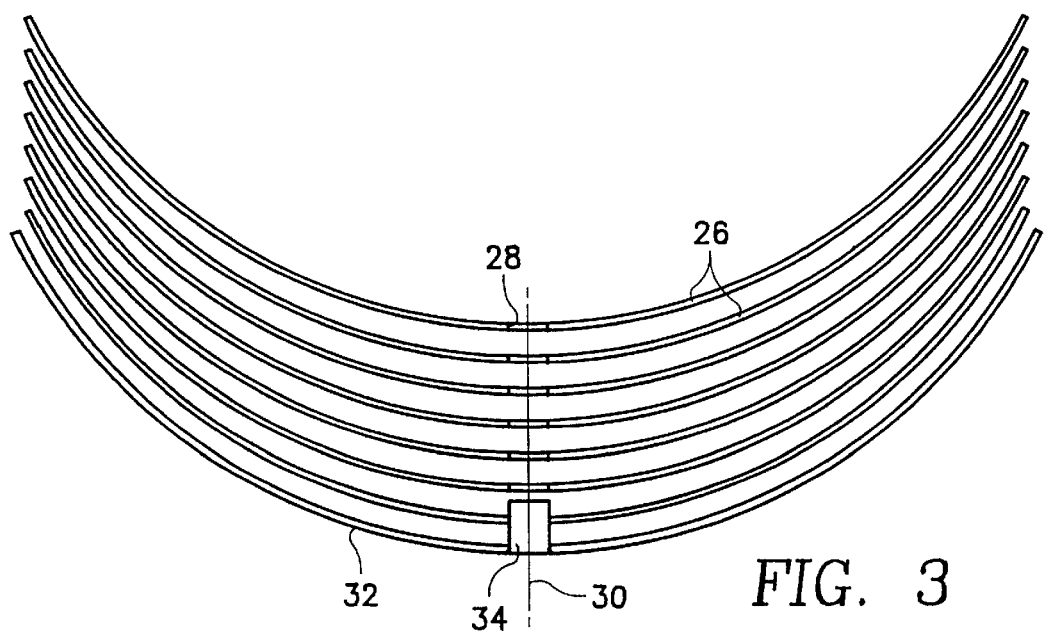
FIG. 3 is an exploded view showing the details of construction of the low carbon steel plates that make up the primary constructional element of the flux band.
Figure 4:
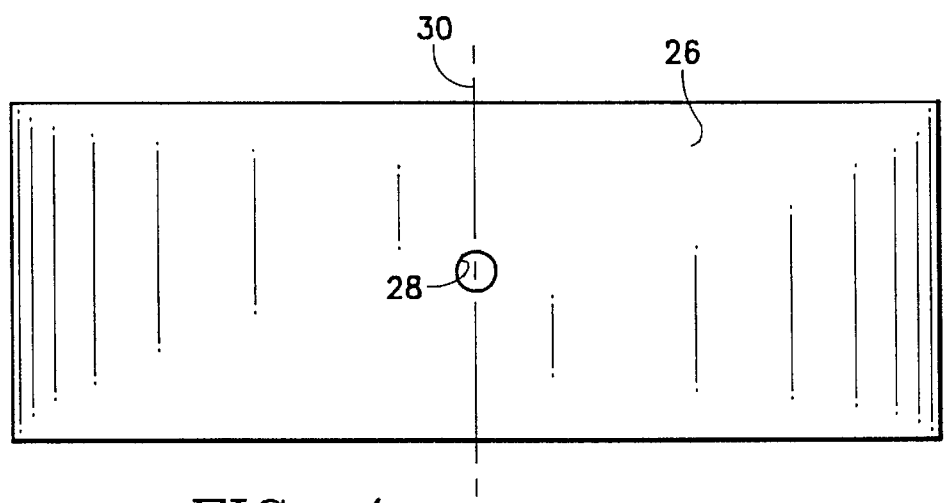
FIG. 4 is a top plan view of one of the steel plates used in conjunction with the magnetic device of the present invention.

The present invention comprises an assembly 8 for generating a strong magnetic field that penetrates radially inward into an oil filter canister with sufficient field strength to attract and retain micron and submicron sized metallic particles. The device of the present invention utilizes a series of magnets 10 and 12. Each of the magnets 10 and 12 are identical. The magnets 10 are arranged in a left grouping of four while the magnets 12 are arranged in a right grouping of four magnets. The magnets 10 and 12 can comprise any particular any particular type of magnet. One particular type of magnet is comprised of fully dense, sintered neodymium iron boron. Typically, the magnets will have an intensity of between 15 MG.Oe to thirty-five MG.Oe. The magnets 10 are arranged side-by-side as well as the magnets 12.

It is noticed in referring to FIG. 2 of the drawings that the arrangements of the magnets 10 and 12 is such that the outer surface of magnets 10 and 12 are all located on an arc of a circle 14. The magnets 10 and 12 are to be constructed so that their sidewalls 16 are not perpendicular with the front surface and back surface but are actually angled slightly. The angling of the sidewall 16 is such that when the magnets 10 and 12 are located in an edge abutting position and are abutting one another in a flush relationship, the outer surface of the magnets 10 and 12 will be located on the circle 14. Typically, each magnet 10 and 12 will be coated with a coating such as nickel plating, chrome plating or plastic in order to prevent rust of the magnets 10 and 12. To eliminate the possibility of the magnets 10 and 12 of wearing through the coating 18 which would make the magnets 10 and 12 subject to rust, there may be inserted between each directly abutting magnets 10 and 12 a thin plastic strip 20. A typical material of construction for the strip 20 would be a polypropylene film. The magnets 10 and 12 are mounted within a plastic injection molded frame 22. The magnets 10 and 12 are basically fixed in position within the frame 22.

The frame 22 has a hollow cavity 24. Within the hollow cavity 24 is mounted a stacked series of arcuate shaped low carbon steel plates with there being seven in number of inner plates 26. The inside surface of the magnets 10 and 12 are located in physical contact with the outermost inner plate 26. The inner plates 26 are basically identical and each have a hole 28 which is centrally located along the mid axis 30 which is located at the longitudinal center of the length of each plate 26. There is also used an outer plate 32 which is similar to inner plates 26. Outer plate 32 may be stainless steel or a non-ferrous material. The outer plate 32, instead of a hole 28, includes a pin 34. The pin 34 is to be located within a tight fitting relationship within each of the holes 28 of each of the plates 26 thereby forming an assembled together unit of the inner plate 26 and the outer plate 32 with these plates located in a stacked relationship. The plates are held in their established position by means of the frame 22. The outer surface of the frame 22 includes an enlarged cutout 36.

Because of the arrangement of the series of thin plates 26 and 32, and the fact that the frame 22 is constructed of a nylon, plastic or rubber material (any moldable non-ferrous material), adjusting movement is permitted which permits the entire device to flex between the dotted line positions 35 and 39 shown in FIG. 2. The outer surface of the magnets 10 and 12 are to be magnetically applied against the exterior surface 38 of a canister wall 33 of a cylindrically shaped oil filter 40. A typical size of a canister wall 33 would be one that has a diameter of three inches. However, this particular size of oil filter 40 can vary somewhat between applications where one application needs an oil filter that has a diameter of 2.8 inches and another application needs a 3.2 inch diameter. When placing of the device of this invention on the exterior surface 38, the device will automatically accommodate to both a smaller diameter or a larger diameter with the outer surface 37 of each of the magnets 10 and 12 being maintained flush against the exterior surface 38 regardless of the diameter of the oil filter 40 by the plates 26 and 32 expanding slightly or conforming slightly forming respectively a circle 14 of greater diameter (dotted line position 39) or a circle 14 of smaller diameter (dotted line position 35). This expanding or compressing causes the plates 26 and 32 to slide relative to each other except in the area of pin 34 and holes 28. The plates 26 and 32 generally vary in thickness from 0.015 to 0.025 of an inch. The use of the plurality of the plates 26 and 32 is what permits the bending or flexing to occur to permit the adjustability between the dotted line positions shown in FIG. 2. The at-rest position of circle 14 would normally be three inches in diameter with the dotted line positions being approximately 2.8 inches and 3.2 inches.

The plate 32 could be constructed of aluminum and also may be ribbed to dissipate heat. It is known that the higher the heat the lower the magnetic energy of the magnets 10 and 12. Therefore, by using of the aluminum in its ribbed configuration, the plate 32 could function as a heat dissipator to keep the magnetic force of the magnets at the highest possible level.

The mid axis 30 comprises a plane dividing of the plates 25 and 32 into halves. Although the frame 22 is described as being nylon, rubber or plastic, it is also to be within the scope of this invention that it could be stainless steel, aluminum or another form of steel. The frame 22 could be molded into one piece or could be constructed to be a plurality of pieces which are secured together by being snapped together, glued together or sonicly welded together. It is important that each of the strips 20 be made of a non-metallic material with generally the thickness being about 0.002 of an inch. However, this thickness could vary. There is to be a lanyard 42 in the form of a spring, rope, chain or braided wire that is to be connected between the frame 22 and attached to an exterior structure such as a part of a vehicle frame 43. The frame 43 is to have a threaded hole 45. The lanyard 42 terminates at its free end in a loop 47. A bolt 49 is to be conducted through loop 47 with bolt 49 being secured within hole 45. This means that the assembly 8 is always connected to the vehicle frame and cannot be misplaced when changing the oil filter 40 so the assembly is readily available to be reinstalled on the new oil filter 40.

The number and thickness of the plates 26 and 32 can vary according to the strength of the magnets 10 and 12. The overall mass of the plates 26 and 32 should be sufficient to substantially carry the magnetic flux generated by the magnets 10 and 12 yet should also be sufficiently thin to avoid adding unnecessary weight of the device. One of the functions of the plates 26 and 32 is to provide an effective, low reluctance path for proper retention and redirection of the flux emanating from the magnets 10 and 12. For a magnetic strength of approximately 15MG.Oe, the total thickness of the plates 26 should be about 0.060 of an inch. If the strength of the magnets 10 and 12 is around 35MG.Oe, then the total thickness of the plates 26 should be about 0.100 of an inch.

It has been discovered that as the device fluctuates between the dotted line position in FIG. 2, there is a tight rubbing together of the surfaces between the magnets 10 and between the magnets 12. In order to keep this rubbing from eliminating of the coating 18 and exposing surfaces of the magnets to moisture and therefore rusting, the strips 20 may be located between the abutted surfaces of the magnets 10 and the magnets 12. However, the use of the strips 20 is deemed to be an option as the coating 18 may constitute sufficient protection.

The oil filter 40 is shown to be the configuration that is manufactured by AC-Delco, General Motors Corporation and used on automotive engines. However, it is to be understood that any similar type of oil filter by any manufacturer would be usable in conjunction with the magnetic device of the present invention.

Typically, the oil filter 40 has a sidewall defined as a canister wall 33 that has the thickness of 0.0014–0.0018 of an inch with thin wall canisters, and 0.0028–0.0032 of an inch with thick wall canisters. The thick wall canisters are designed to carry higher gallons per minute of a flow rate there within. A paper filter element 43 is contained within the canister wall 33 and is generally cylindrical in shape and includes a hollow center core with a center shaft to align with threaded opening 44 which is to be used to attach the canister wall 33 onto its appropriate location within the automobile engine. Threaded opening 44 is mounted within a circular plate 46 which is flushly mounted on the top end of the canister wall 33. The circular plate 46 includes a rubber seal 48 which is used to prevent leakage of oil from within the oil filter 40 as it is being used. Circular plate 46 also includes a number (eight in number) of small holes 50 which are located in an angularly evenly spaced-apart arrangement circumferentially about the threaded opening 44. Oil is to be conducted through the holes 50. The oil filter 40 is generally threaded by the threaded opening 44 onto a suitable filter mount, which is not shown, which is located on the engine, which is also not shown, in a conventional fashion so that the lubricating oil of the engine enters the oil filter 40 through the holes 50 and then exits through threaded opening 44. The oil that is entered through the holes 50 is then conducted through the filter 43 which is used to capture the larger particles of foreign matter contained within the oil. The structure in operation of the oil filter 40 is deemed to be conventional and is commonly used in conjunction with automobiles, trucks, boats and large generator engines.

The magnets 10 and 12 are designed to attract ferrous particles 45 within the oil and hold such against the inside surface 41 of the canister wall 33 of the oil filter 40. These particles 45 are to remain held there for as long as the magnet device of this invention is mounted on the exterior surface 38. When the user deems it is time to change the oil filter 40, the oil filter 40 is to be removed and then the magnet device disengaged as well as the lanyard 42 from the oil filter 40 and then reinserted on a new oil filter with the new oil filter then being reinstalled in position in conjunction with the filter mount of the engine.

In applications of this invention where the assembly 8 is subjected to extreme vibration or impact, such as in racing of engine driven vehicles, marine or aircraft applications, an external adjustable retention band (not shown) can be used to provide additional securing to the oil filter 40. A recessed notch can be formed in the molding of the frame 22 to provide for connection with the adjustable retention band. This structure was shown in the present inventor's own prior U.S. Pat. No. 5,932,108.

Specifically, the foregoing description of the preferred embodiment of the present invention has been limited to the description of using a magnetic device in conjunction with a type of oil filter that is primarily used in automotive engines. As a person skilled in the art can readily perceive, the present invention can be modified to be used with other types of filter canisters and applications to remove entrained ferrous metallic particles from its circulating fluid, in general. Consequently, the scope of the invention should not be limited to the foregoing description but is to be defined by the appending claims and equivalence thereof.

What is claimed:

1. An assembly for attachment to an exterior wall of an oil filter canister comprising:

an enclosing frame having an internal cavity;

a series of thin walled plates mounted within said cavity, said plates being located in a stacked relationship; and a plurality of magnets mounted in conjunction with said enclosing frame, said magnets having an exposed surface adapted to be placed flush against the oil filter canister, said plates allowing for the flexing of said enclosing frame so said magnets will be flush against the oil filter canister where the oil filter canister is of any size within a certain range of sizes, whereby said magnets generate a magnetic force which not only secures said assembly to the canister but generates a magnetic field within the canister which attracts an holds ferrous particles against the sidewall of the canister preventing such from exiting the canister.

2. The assembly as defined in claim 1 wherein:

said plates having a thickness of less than 0.025 of an inch.

3. The assembly as defined in claim 1 wherein:

said series of thin walled plates being arcuate in their longitudinal configuration so as to closely conform in shape to the exterior surface of the canister.

4. The assembly as defined in claim 1 wherein:

said plates being constructed of steel.

5. The assembly as defined in claim 1 wherein:

said series of thin walled plates having a longitudinal center, said plates being secured together at said longitudinal center.

6. The assembly as defined in claim 1 wherein:

a plastic strip being mounted between abutting wall surfaces of said magnets.

7. The assembly as defined in claim 1 wherein:

said magnets being coated with a non-ferrous covering.

8. The assembly as defined in claim 1 including:

a lanyard being attached to said enclosing frame, said lanyard being adapted to be attached to an exterior structure thereby preventing separation of said assembly from an installing location and readily available to be reinstalled on a new oil filter canister.

9. The assembly as defined in claim 1 wherein:

said magnets being fixed in position relative to said enclosing frame.

10. An assembly for attachment to an exterior wall of a cylindrical filter canister through which a liquid is to pass comprising:

a plurality of thin walled plates located in a stack, there being an inner plate and an outer plate, said inner plate adapted to be located directly adjacent with an exterior wall of the canister with said outer plate located a greater distance from the exterior wall; and a plurality of magnets mounted against said inner plate, said magnets having an exposed surface adapted to be placed against the exterior wall of the canister, said plates permitting flexing of said stack so said magnets will always be mounted flush against the exterior wall of the canister selected from a plurality of different diameters of canisters, whereby said magnets generate a magnetic force which not only secures said assembly to the canister but generates a magnetic field within the canister which attracts and holds ferrous particles that are flowing with the liquid against the canister preventing such from exiting the canister by continuing to flow with the liquid.

11. The assembly as defined in claim 10 wherein:

said plates are arcuate forming a concave surface at said inner plate, said magnets being mounted within said concave surface.

12. The assembly as defined in claim 10 wherein:

said stack having a longitudinal dimension, said stack having an arcuate shape along said longitudinal dimension, said stack being flexible so as to vary said arcuate shape.

13. The assembly as defined in claim 10 wherein:

said plates being constructed of a ferrous material.

14. An assembly for attachment to an exterior wall of a cylindrical oil filter canister through which is to be conducted flowing liquid, said canister having an exterior wall and an interior wall with the liquid to be in contact with said interior wall, said assembly comprising:

a housing to be placed on said exterior wall;

a plurality of ferrous metallic members mounted on said housing with said housing to be mounted on said exterior wall of said canister, at least two of said ferrous metallic members having substantially the same thickness; and a plurality of magnets attached to said housing and mounted against said metallic members, said magnets having an exposed surface adapted to be placed against the oil filter canister, said members permitting flexing of said housing so said magnets will always be mounted flush against said interior wall of the canister selected from a plurality of different diameters of canisters, whereby said magnets generate a magnetic force which not only secures said assembly to the canister but generates a magnetic field within the canister which attracts and hold ferrous particles submerged within the liquid against said interior wall of said canister preventing such from flowing with the liquid.

* * * * *